United States Patent
Nakashima et al.

(10) Patent No.: US 7,824,518 B2
(45) Date of Patent: Nov. 2, 2010

(54) INKJET HEADS AND METHODS OF MANUFACTURING INKJET HEADS

(75) Inventors: Atsuhisa Nakashima, Nagoya (JP); Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 311 days.

(21) Appl. No.: 11/852,951

(22) Filed: Sep. 10, 2007

(65) Prior Publication Data

US 2008/0202679 A1 Aug. 28, 2008

(30) Foreign Application Priority Data

Sep. 8, 2006 (JP) ............................. 2006-244107

(51) Int. Cl.
B29C 65/00 (2006.01)
B32B 37/00 (2006.01)
C08J 5/00 (2006.01)
B31F 5/00 (2006.01)
B65C 9/08 (2006.01)
B23K 37/00 (2006.01)
B41J 2/045 (2006.01)

(52) U.S. Cl. .................... 156/307.1; 156/563; 156/580; 347/71

(58) Field of Classification Search .................. 156/60, 156/182, 250, 252, 256, 263, 264, 272.2, 156/273.3, 273.5, 273.7, 275.5, 275.7, 288, 156/295, 307.1, 307.7, 311, 330, 349, 379.6, 156/379.8, 381, 391, 499, 510, 538, 539, 156/556, 559, 563, 580, 581, 583.1; 347/20, 347/44, 47, 54, 68, 69, 70, 71, 72

See application file for complete search history.

(56) References Cited

U.S. PATENT DOCUMENTS 5,498,306 A * 3/1996 Shibata et al. ........... 156/275.3

(Continued)

FOREIGN PATENT DOCUMENTS

JP H07-256882 A 10/1995
JP 2005186383 A 7/2005

(Continued)

OTHER PUBLICATIONS

Japanese Patent Office, Notice of Reasons for Rejection for Japanese Patent Application No. 2006-244107 (counterpart to above-captioned patent application), mailed Aug. 12, 2008.

*Primary Examiner*—Richard Crispino
*Assistant Examiner*—Brian R Slawski
(74) *Attorney, Agent, or Firm*—Baker Botts L.L.P.

(57) ABSTRACT

In order to manufacture an ink-jet head, a head body and a reservoir unit are formed first. Then, UV-cured resin is applied on the lower surface of the reservoir unit. Then, the head body is placed on a plane of a jig so that the plane abuts against the ink discharge surface. Then, the reservoir unit is positioned with respect to the head body and the jig so that an ink reservoir of the reservoir unit and ink flow channels of a flow channel unit are brought into communication and the both ends in the longitudinal direction of a reservoir base plate and the upper surfaces of walls oppose to each other, and the reservoir unit is laminated on upper surface of the flow channel unit via the UV-cured resin. Subsequently, the UV-cured resin is cured in a state in which the lower surface of the reservoir base plate abuts against the upper surfaces of the walls.

6 Claims, 10 Drawing Sheets

U.S. PATENT DOCUMENTS

2005/0140723 A1* 6/2005 Taira ..................... 347/40
2005/0195249 A1* 9/2005 Nakamura et al. ............ 347/71
2005/0278951 A1 12/2005 Matsuyama et al.

FOREIGN PATENT DOCUMENTS

| JP | 2005-246779 A | 9/2005 |
| JP | 2006-007442 A | 1/2006 |

* cited by examiner

SHORT SIDE DIRECTION

LONGITUDINAL DIRECTION

INKJET HEADS AND METHODS OF MANUFACTURING INKJET HEADS

RELATED APPLICATION

This application claims priority to Japanese Application No. 2006-244107, filed Sep. 8, 2006, whose contents are expressly incorporated by reference.

BACKGROUND OF THE INVENTION

1. Field of the Invention

The present invention relates to an inkjet head which discharges ink onto a recording medium, and methods of manufacturing the same.

2. Description of the Related Art

In a known inkjet head apparatus, au ink-jet head assembly has ink-jet heads having a flow channel unit being formed with a plurality of individual ink flow channels extending from a manifold to nozzles through pressure chambers. In a known inkjet head apparatus, a head body has an actuator unit for exerting pressure to ink in the pressure chambers, a reservoir unit on the upper surface of the head body, and a plate fixed to the upper surface of the reservoir unit.

A known ink-jet head assembly has a reservoir unit and a flow channel unit constructed from plates. The flow channel unit also has nozzles which eject ink therefrom. The plates are joined to each other with an adhesive agent, and the thickness of the adhesive agent varies from ink-jet head to ink-jet head. When printing is performed on a recording medium by an ink-jet printer provided with a known ink-jet head assembly, the varied thickness of the adhesive reduces the positional accuracy of the points of landing of ink discharged from the nozzle, causing printing quality to be deteriorated.

SUMMARY OF TEE INVENTION

Therefore, a need has arisen for methods of manufacturing an ink-jet head which overcome these and other shortcomings of the related art. A technical advantage of the present invention may be that a distance from a fixing plate to an ink discharge surface may be constant.

According to an embodiment of the present invention, a method of manufacturing an ink-jet head, in which the ink-jet head comprises a plurality of plates comprising a nozzle plate having an ink discharge surface, and a fixing plate, comprises the steps of forming at least one hole through each of the plurality of plates, and applying an adhesive agent to at least a first one of the plurality of plates. The method also comprises the steps of contacting the ink discharge surface and a support surface of a jig, and contacting the first of the plurality of plates and a second of the plurality of plates, such that the at least one hole through each of the plurality of plates defines a flow channel through the plurality of plates. Moreover, the method also includes the step of contacting the fixing plate and at least a pair of abutment portions of the jig, in which the pair of abutment portions of the jig are positioned adjacent to and are raised with respect to the support surface of the jig, and a length of the fixing plate is greater than a length of each of the nozzle plate, the first one of the plurality of plates, and the second one of the plurality of plates. In addition, the method comprises the step of curing the adhesive agent.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

DETAILED DESCRIPTION OF PREFERRED EMBODIMENTS

Embodiments of the present invention and their features and technical advantages may be understood by referring to FIGS. 1-10, like numerals being used for like corresponding portions in the various drawings.

Figure 1:
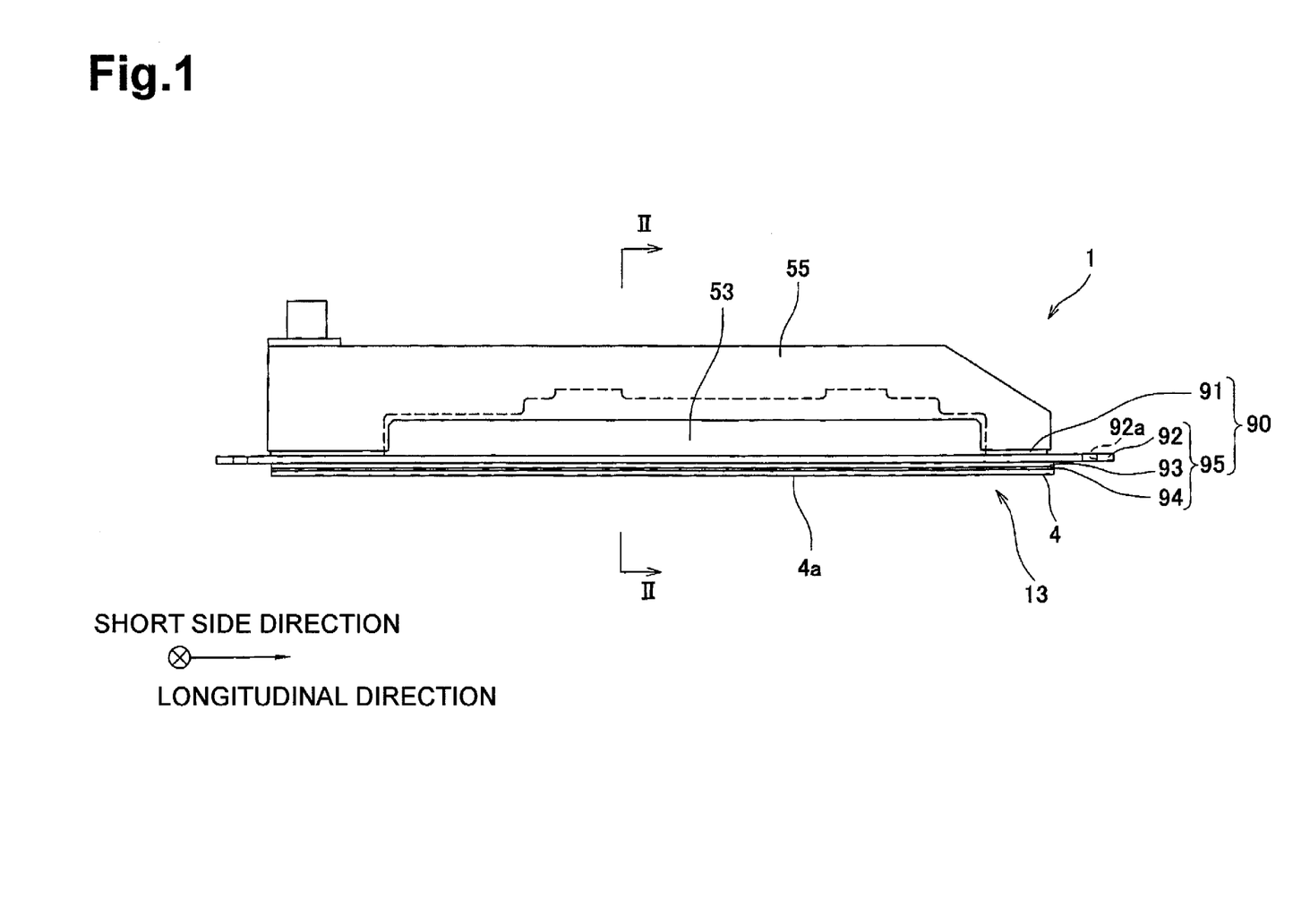
FIG. 1 is a side view of an ink jet head according to an embodiment of the present invention.
Figure 2:
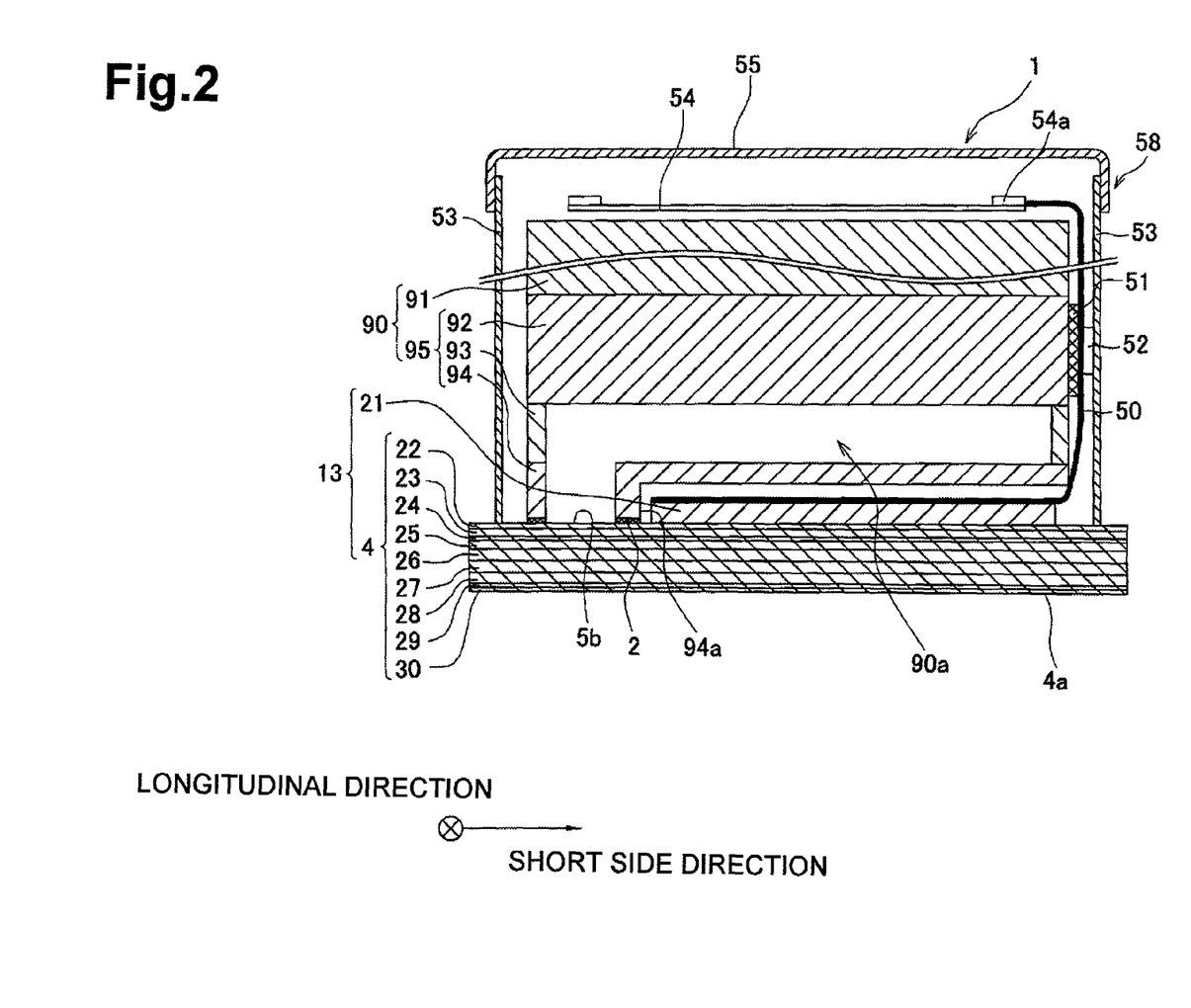
FIG. 2 is a cross-sectional view of the ink-jet head of FIG. 1, taken along the line II-II shown in FIG. 1, according to an embodiment of the present invention.

As shown in FIGS. 1 and 2, an ink-jet head 1 may have a substantially rectangular parallelepiped shape, and a longitudinal direction of the ink-jet head 1 is oriented in the left-and-right direction in FIG. 1. The ink-jet head 1 may comprise a bead body 13 comprising a flow channel unit 4 and an actuator unit 21, a reservoir unit 90 arranged on the upper surface of the head body 13 for supplying ink to the head body 13, a flexible printed circuit (FPC) 50 comprising a driver integrated circuit (IC) 52 mounted thereon for supplying drive signals to the actuator unit 21, and a control board 54 electrically connected to the FPC 50.

An end of the FPC 50 may be electrically connected to the upper surface of the actuator unit 21, and the other end of the FPC 50 may be connected to a connector 54a of the control board 54 arranged horizontally above the reservoir unit 90. The driver IC 52 may be configured to supply the drive signals to the actuator units 21 via a wiring provided on the FPC 50 based on a command from the control board 54.

The reservoir unit 90 may comprise an ink reservoir 90a for storing ink therein, and the ink reservoir 90a may be in fluid communication with ink supply ports 5b of the flow channel unit 4. Therefore, the ink in the ink reservoir 90a may be supplied to the ink flow channels in the flow channel unit 4 via the ink supply ports 5b.

Figure 3:
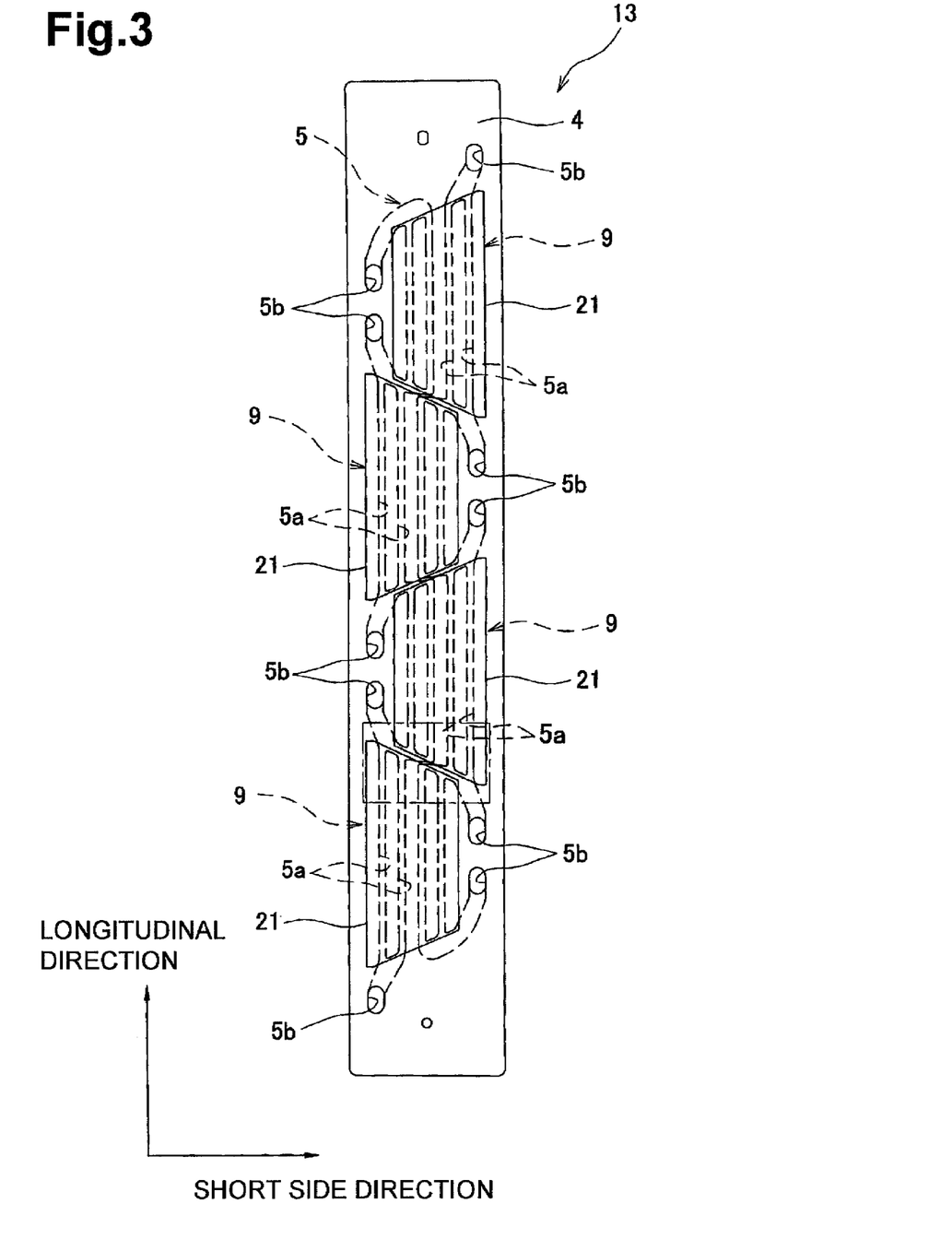
FIG. 3 is a plan view of an inkjet head body shown in FIG. 2.

The actuator unit 21, the reservoir unit 90, the control board 54, and the FPC 50 may be covered by a side cover 53 and a head cover 55, e.g., a head cover comprising a metallic material, such that ink or ink mist may not enter the head cover 55. A sponge 51 may be positioned between a side surface of the reservoir unit 90 and the FCP 50, and the sponge 51 may have a resiliency, and the driver IC 52 may be pressed toward the inside of the side cover 53 by the sponge 51. Therefore, heat generated in the driver IC 52 may be quickly released from the head cover 55 via the side cover 53. As shown in FIG. 3, the flow channel unit 4 of the head body 13 may have a rectangular flat plane shape extending in the same direction as the longitudinal direction of the ink-jet head 1. In an embodiment, four of the actuator units 21, which may have a trapezoidal shape, may be bonded to the upper surface of the flow channel unit 4 and may be arranged in two rows and in a zigzag pattern.

Figure 4:
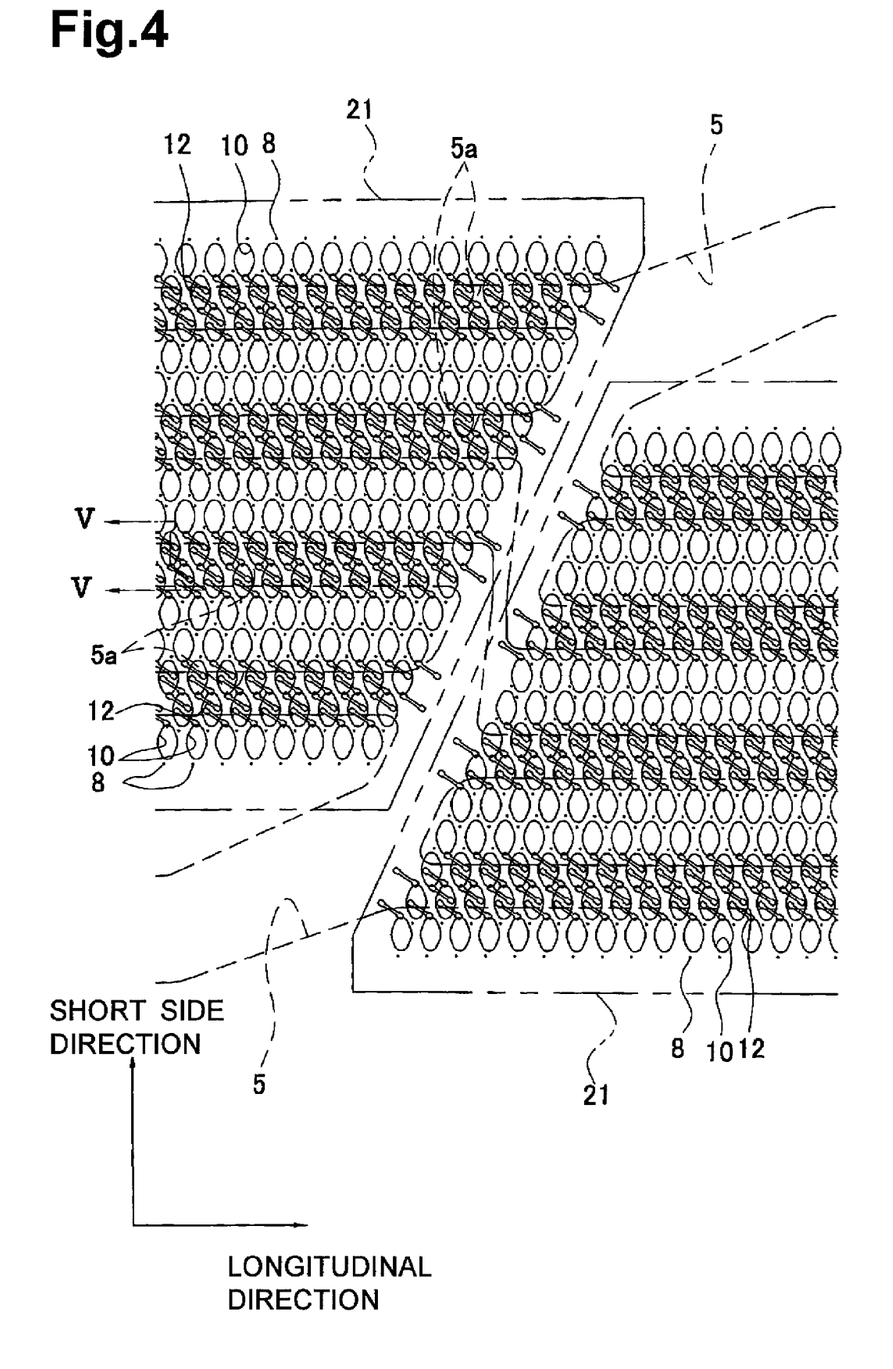
FIG. 4 is an enlarged view of an area surrounded by a dashed line in FIG. 3.

A plurality of nozzles 8 may be arranged on the lower surface of the flow channel unit 4, e.g., on an ink discharge surface 4a, in areas opposing the bonding areas of the actuator unit 21. As shown in FIG. 4, each actuator 21 may comprise a pressure chamber group 9, and each pressure chamber group 9 may comprise a plurality of pressure chambers 10. Each of the plurality of pressure chambers 10 may have a substantially diamond shape with rounded corners, and may be are arranged in an matrix shape along two directions on the upper surface of the flow channel unit 4. For example, sixteen rows of the pressure chambers 10 may be arranged in the longitudinal direction of the flow channel unit 4 at equal distances, and each pressure chamber 10 may be arranged in the direction of the short side of the flow channel unit 4 in parallel to each other. The pressure chambers 10 may be arranged, such that a the number of the pressure chambers 10 included in the respective pressure chamber row decreases from the long side toward the short side corresponding to the contour shape of the actuator unit 21. The nozzles may be similarly arranged r as the pressure chambers 10.

The manifold flow channels 5 continuing from the ink supply ports 5b, and sub-manifold flow channels 5a branching from the manifold flow channels 5, may be formed in the flow channel unit 4. The sub-manifold flow channels 5a may extend in the longitudinal direction of the flow channel unit 4 in the areas opposing the actuator units 21. The plurality of pressure chambers 10 may be arranged along the sub-manifold flow channels 5a on the upper surface of the flow channel unit 4, such that the sixteen pressure chamber rows extend in the direction of the short side of the flow channel unit 4 in parallel to each other. When viewing rows of pressure chambers in the longitudinal direction, rows of pressure chambers in a pressure chamber group 9 may be linearly aligned with corresponding rows of pressure chambers in another pressure group 9, except for an uppermost row and a lowermost row of a pressure chamber group 9. On the other hand, in the ink discharge surface on the opposite side, a plurality of the nozzles 8 are arranged in the same manner as the pressure chambers 10. For easiness of comprehension of the drawings, the actuator units 21 are drawn in double dashed chain lines in FIG. 4, and the pressure chambers 10 and apertures 12 which should be drawn in broken lines since they are located below the actuator units 21 are drawn in solid lines.

Figure 5:
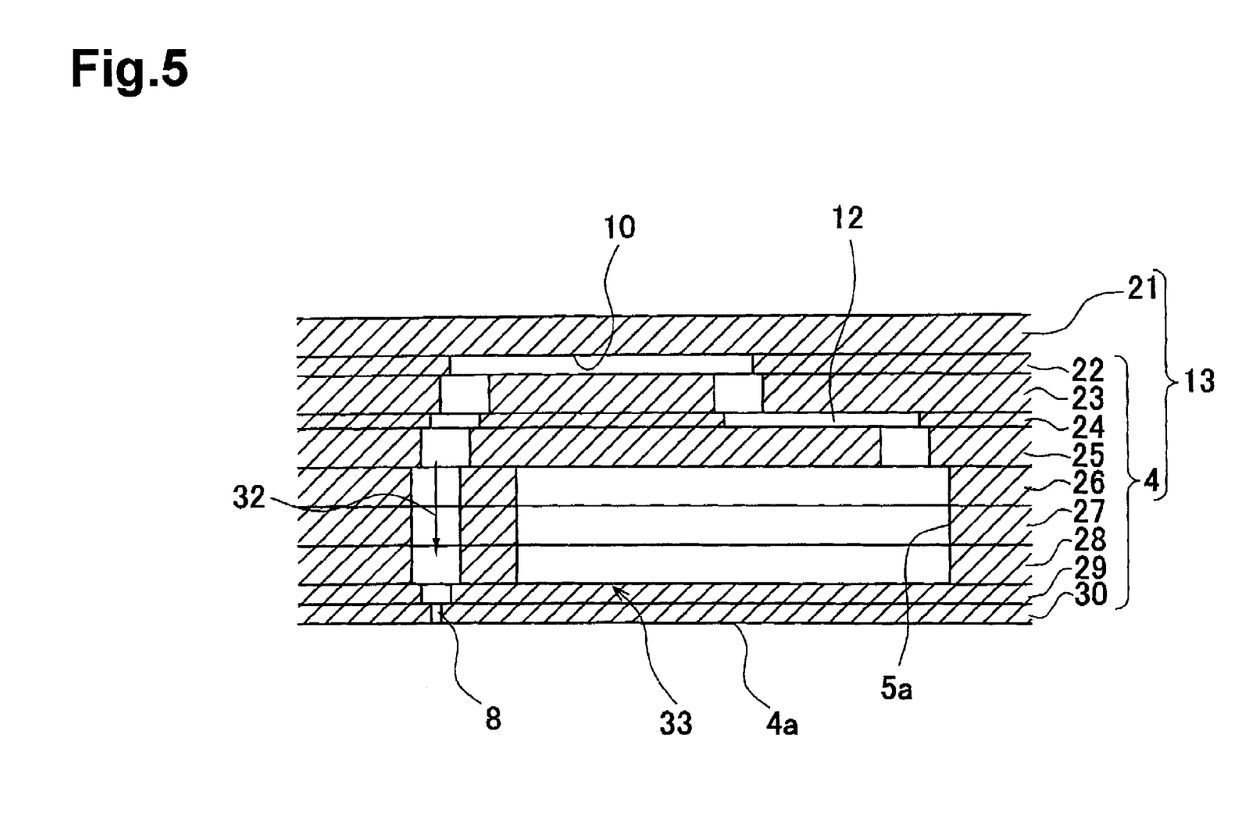
FIG. 5 is a cross-sectional view of an inkjet head body, taken along the line V-V in FIG. 4, according to an embodiment of the present invention.

Subsequently, a cross-sectional structure of the head body 13 will be described. As shown in FIG. 5, the head body 13 includes the flow channel unit 4 and the actuator units 21 adhered to each other. The flow channel unit 4 may have a laminated structure in which nine metal plates including, from the top, a cavity plate 22, a base plate 23, an aperture plate 24, a supply plate 25, manifold plates 26, 27, and 28, a cover plate 29, and a nozzle plate 30 are laminated on top of each other. With holes formed on the respective metal plates 22 to 30, a plurality of individual ink flow channels 32 extending from the exits of the sub-manifold flow channels 5a to the nozzles 8 via the apertures 12 and the pressure chambers 10 are formed in the flow channel unit 4. In this manner, the flow channel unit 4 is formed with ink flow channels 33 extending from the ink supply ports 5b to the nozzles 8 including the manifold flow channels 5, the sub-manifold flow channels 5a branched from the manifold flow channels 5, and the individual ink flow channels 32 branched further from the sub-manifold flow channels 5a. Then, the actuator units 21 may be bonded to the upper surface of the flow channel unit 4 so as to close the openings of the pressure chambers 10.

Figure 6A:
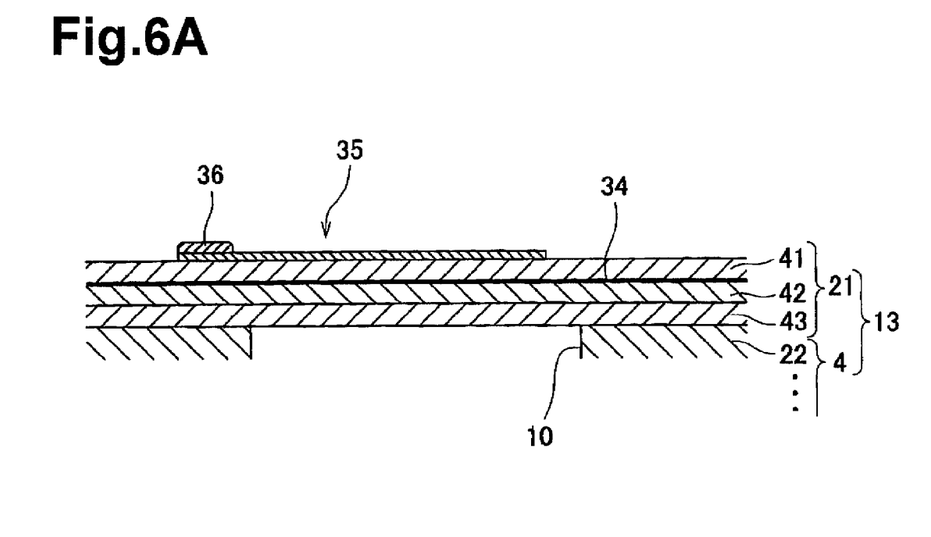
FIG. 6A is a partial cross-sectional view of an actuator unit according to an embodiment of the present invention.

The actuator unit 21 will now be described. As shown in FIG. 6A, the actuator unit 21 includes three piezoelectric sheets 41 to 43 each having the same thickness on the order of 15 μm. These piezoelectric sheets 41 to 43 may be continuously layered flat plates extending across all the pressure chambers 10 which constitute one pressure chamber group 9. Since the piezoelectric sheets 41 to 43 are formed as the continuous flat plate layer, the individual electrodes 35 may be arranged at a high density on the piezoelectric sheet 41 using, for example, a screen printing technology. The piezoelectric sheets 41 to 43 may be formed of ceramic material based on lead zirconium titanate (PZT) having ferroelectricity.

Figure 6B:
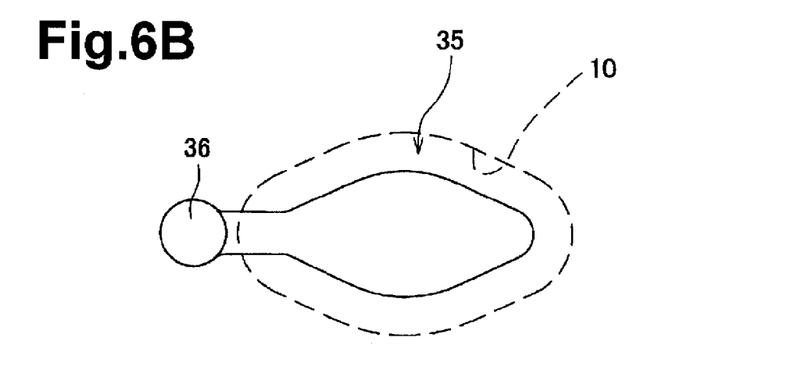
FIG. 6B is a plan view of an individual electrode of the actuator unit, according to an embodiment of the present invention.

The individual electrodes 35 each may have a thickness of approximately 1 μm and, as shown in FIG. 6B, have a flat shape of substantially diamond shape, which is similar to the pressure chamber 10. One of acute angle portions of the substantially diamond shaped individual electrode 35 may be extended and a circular land 36 having a diameter of approximately 160 μm is provided at the distal end thereof.

Arranged between the piezoelectric sheet 41 as the uppermost layer and the piezoelectric sheet 42 located at one layer below may be a common electrode 34. The common electrode 34 may be formed substantially entirely of the upper surface of the piezoelectric sheet 42, and may be grounded in an area not shown. Accordingly, the potential may be controlled on the individual electrode 35 respectively.

The actuator unit 21 may have a configuration of, so-called, unimorph type, and a number of individual actuators may be formed corresponding to the individual electrodes 35.

Subsequently, the operation of the actuator units 21 will be described. The actuator units 21 may receive supply of drive signals from the driver IC 52 upon reception of discharge request from the outside. The respective actuators are deformed to be projected toward the pressure chamber 10 upon reception of the drive signal. At this time, the pressure of ink in the pressure chamber 10 is increased, and hence ink may be discharged from the nozzles 8.

The reservoir unit 90 will now be described. The reservoir unit 90 includes a lower reservoir 95 bonded to the upper surface of the flow channel unit 4 via an adhesive layer 2 formed of UV cured resin as adhesive agent, and an upper reservoir 91 formed of resin and arranged on the upper surface of the lower reservoir 95 fixed with a screw as shown in FIG. 2 and FIG. 7.

The lower reservoir 95 includes three plates of a reservoir base plate 92 formed of metal, a reservoir plate 93, and an under plate 94 aligned and laminated to each other. The three plates 92 to 94 may have the same longitudinal direction as the longitudinal direction of the flow channel unit 4. The length of the short side of these three plates 92 to 94 may be shorter than the distance between the two side covers 53 as shown in FIG. 2.

Figure 7:
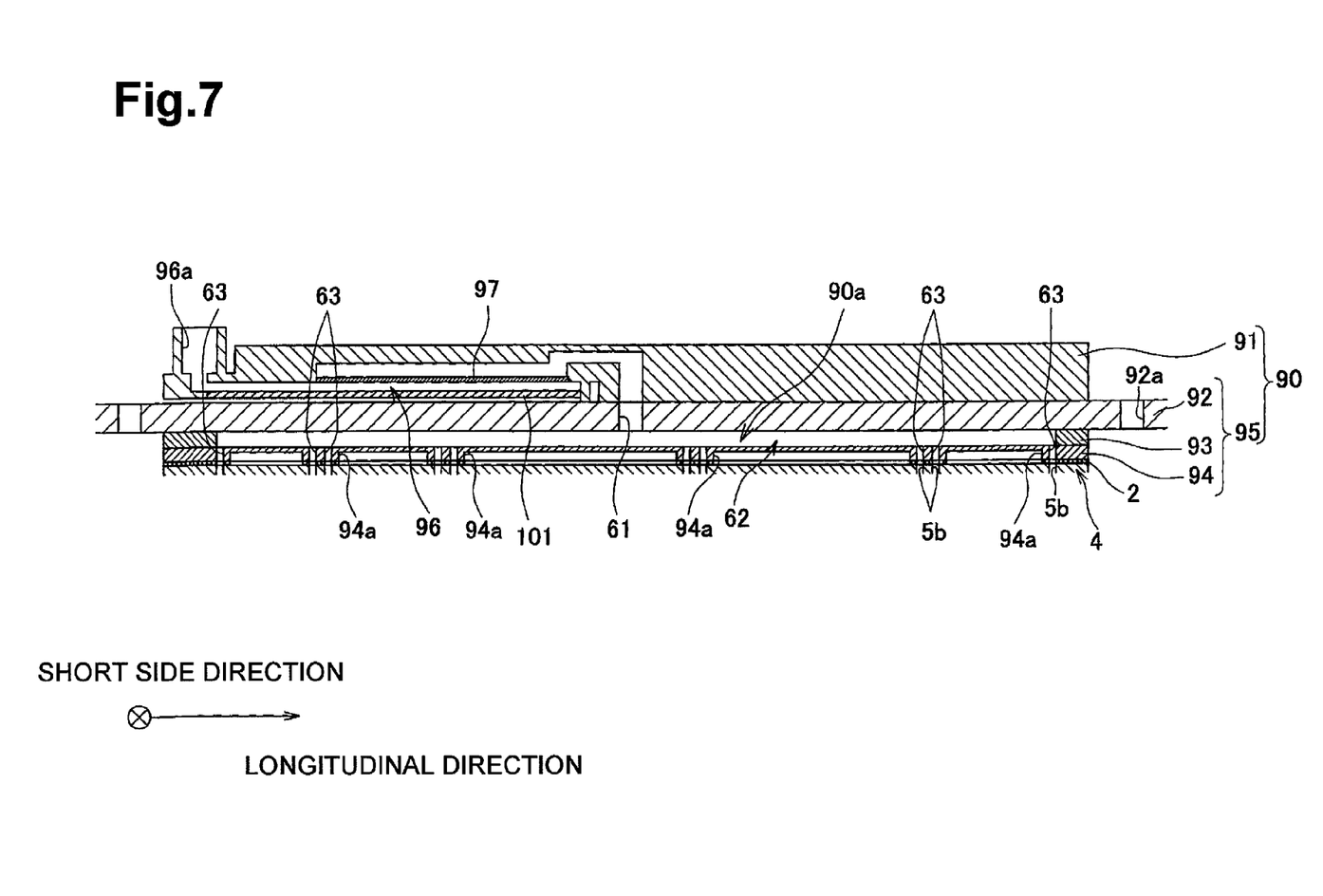
FIG. 7 is a vertical cross-sectional view of a reservoir unit shown in FIG. 1.

As shown in FIG. 7, the reservoir base plate 92 may be formed to have a larger thickness than the reservoir plate 93 and the under plate 94, and is higher in strength than these two plates 93 and 94. As shown in FIG. 1 and FIG. 7, the reservoir base plate 92 extends towards both sides so as to be longer than the reservoir plate 93 and the under plate 94 in the longitudinal direction. On the other hand, the reservoir plate 93 and the under plate 94 may have substantially the same length as the nine plates 22 to 30 which constitute the flow channel unit 4 in the longitudinal direction. In other words, the plurality of plates which constitute the reservoir unit 90 and the flow channel unit 4 may be divided into two groups; a group of plates which have substantially the same length except for the reservoir base plate 92, and a group of the reservoir base plate 92, which is longer than these plates, that is, the longest reservoir base plate 92.

At the both ends in the longitudinal direction of the reservoir base plate 92, there are formed through holes 92*a*. The reservoir base plate 92 is fixed with a screw to the ink-jet printer via these through holes 92*a*. In other words, the reservoir base plate 92 is a fixing plate for fixing the entire ink-jet head to the printer.

The reservoir base plate 92 may be formed with a through hole 61 for communicating an ink flow channel 96 in the upper reservoir 91 and an ink flow channel 62 formed on the reservoir plate 93. The reservoir plate 93 may be formed with a hole which serves as the ink flow channel 62 which communicates with the through hole 61 and ten through holes 63 formed on the under plate 94. The under plate 94 may be formed with through holes 63 respectively at positions opposing the ten ink supply ports 5*b* in plan view. The under plate 94 may be formed with recesses 94*a* having a less thickness at portions of the lower surface thereof where the through holes 63 are not formed. Accordingly, when the lower reservoir 95 is bonded to the flow channel unit 4 via the adhesive layer 2, gaps may be formed between the flow channel unit 4 and the lower reservoir 95 by the recess 94*a*. Then, the actuator units 21 may be arranged in these gaps.

The upper reservoir 91 may be formed with the ink flow channel 96 in the inside thereof. The ink flow channel 96 includes an ink supply portion 96*a* opening on the upper surface at an upper left position in FIG. 7, and ink may be supplied from the opening of the ink supply portion 96*a*. A damper film 101 extending along the reservoir base plate 92 may be provided in the lower portion of the ink flow channel 96. The damper film 101 may damp vibration transmitted to ink in the reservoir unit 90. A filter 97 is provided in the midsection of the ink flow channel 96 at an area opposing the damper film 101. Therefore, ink supplied from the ink supply portion 96*a* may be brought into free of foreign substances mixed therein by the filter 97, and flowed into the lower reservoir 95.

In this manner, the reservoir unit 90 includes the ink flow channel 96 formed on the upper reservoir 91, and the ink reservoir 90*a* having the through hole 61, the ink flow channel 62, and the through holes 63 formed on the lower reservoir 95, so that ink supplied to the ink supply port may be distributed to the ink supply ports 5*b* through the through holes 63.

Figure 8:
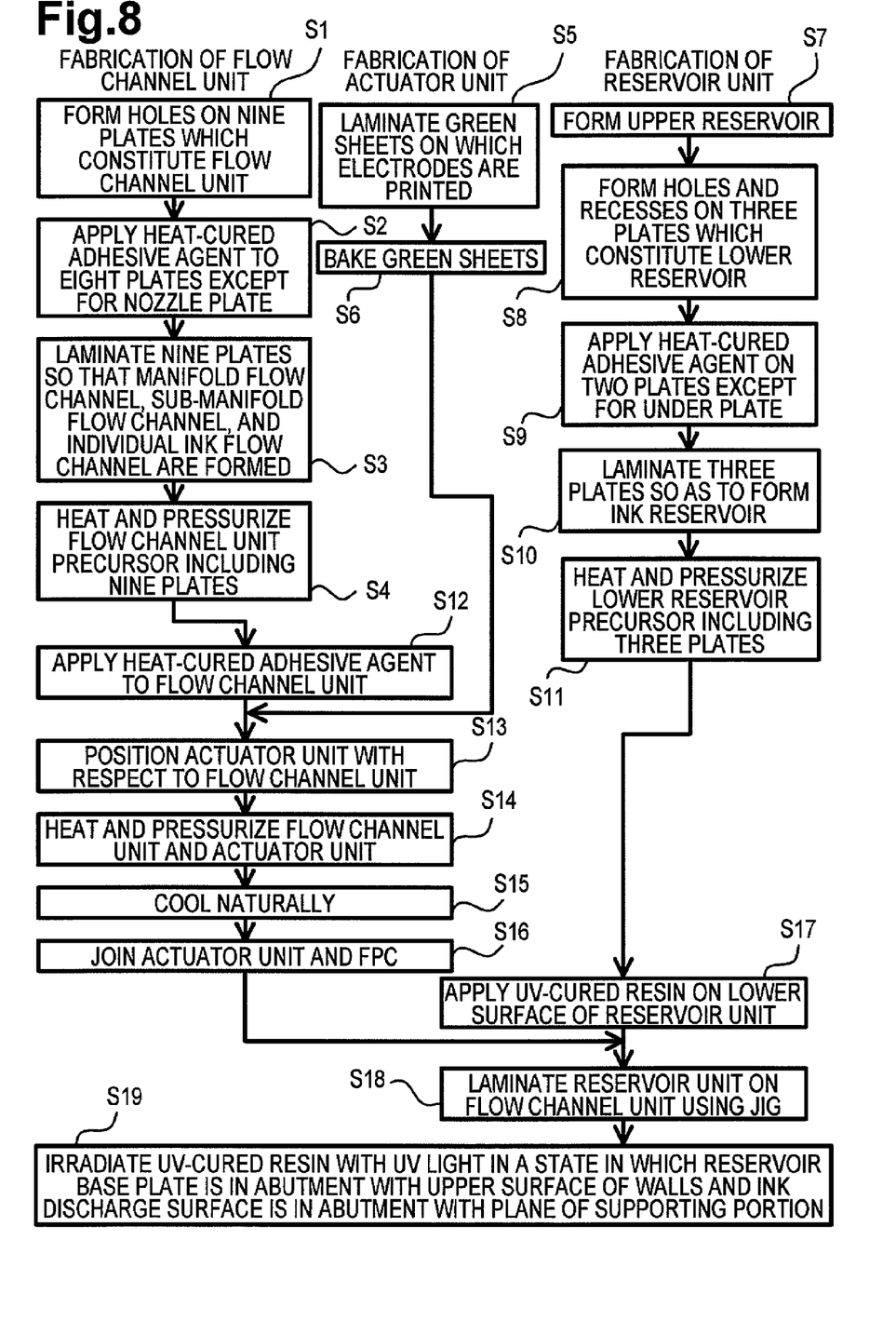
FIG. 8 is a flowchart showing a process of manufacturing the ink-jet head of FIG. 1, according to an embodiment of the present invention.

FIG. 8 shows a method of manufacturing ink-jet head 1 according to an embodiment of the invention. In an embodiment of the invention, some parts of inkjet head 1, e.g., flow channel unit 4, actuator units 21, and reservoir unit 90, may be fabricated separately, and then assembled into inkjet head 1. In an embodiment of the invention, flow channel unit 4, including actuator units 21 laminated thereon, may be assembled with reservoir unit 90 using a jig, as described in step S18. A process of manufacturing flow channel unit 4 according to an embodiment of the invention may be described herein in steps S1 to S4. Referring to FIG. 8, in a first step S1, flow channels may be formed in plates 22 to 30, which, when assembled, may comprise flow channel unit 4. Portions of plates 22 to 30 may be masked to prevent removal of these portions during etching. The remainder of plates 22 to 30 may be etched, removing portions which are not masked, to form openings in plates 22 to 30. These openings may be patterned to form flow channels, e.g., ink supply channels, as shown in FIG. 5, when plates 22 to 30 are assembled as described herein.

Subsequently, in step S2, an adhesive agent, e.g., an epoxy-based heat cured agent, may be applied to the plates. Specifically, adhesive agent may be applied to lower surfaces, e.g., surfaces closest to nozzle plate 30, of respective plates 22 to 29. Nozzle plate 30 may have no adhesive applied to its lower surface. In step S3, the nine plates 22 to 30 may be laminated together as shown in FIG. 5, which may form ink flow channel 33, e.g., manifold flow channels 5, sub-manifold flow channels 5*a*, and individual ink flow channels 32.

In step S4, a flow unit precursor, which may comprise the nine plates 22 to 30 laminated together in step S3, may be pressurized, and also may be heated to a temperature higher than a curing temperature of the adhesive agent. When the higher temperature may be reached, the adhesive agent may be cured, and may bond the nine plates 22 to 30 to each other.

A process of manufacturing actuator unit 21 according to an embodiment of the invention may be described herein in steps S5 to S6. Referring again to FIG. 8, in step S5, a plurality of green sheets formed of piezoelectric ceramics may be first prepared. When forming the green sheet, an amount of shrinkage due to baking may be taken into consideration in advance. On at least one of the plurality of green sheets, conductive paste may be screen-printed in a pattern corresponding to common electrode 34. When aligning green sheets using a sheet aligning jig, green sheets are placed under one another, alternating between a green sheet on which the conductive paste is printed in a pattern of the common electrode 34, and a green sheet on which the conductive paste is not printed, starting and ending with a green sheet on which the conductive paste is not printed.

Then, in step S6, the laminated member created in Step 5 may be degreased using any known method for degreasing ceramics, and may be baked at a predetermined temperature. Accordingly, the plurality of green sheets may serve as piezoelectric sheets 41 to 43, and the conductive paste may serve as common electrode 34. Then, the conductive paste may be screen-printed in a pattern corresponding to individual electrode 35 on piezoelectric sheet 41, as the uppermost layer. The conductive paste also may be baked to form individual electrode 35 on piezoelectric sheet 41. Then, gold containing glass frit may be printed on the surface of the extended portion of individual electrode 35, to form land 36, and completing fabrication of actuator unit 21, as shown in FIG. 6.

A process of manufacturing reservoir unit 90 according to an embodiment of the invention may be described herein in steps S7 to S11. Referring again to FIG. 8, in upper reservoir 91 may be fabricated in step S7. In order to fabricate upper reservoir 91, the resin member of upper reservoir 91 may be formed by any known method of injection molding. Filter 97 and damper film 101 may be bonded to predetermined positions to form upper reservoir 91.

Subsequently, in step S8, flow channels may be formed in plates 92 to 94, which, when assembled, may comprise lower reservoir 95. In order to fabricate lower reservoir 95, plates 92 to 94 may be etched. Prior to etching, portions of plates 92 to 94 may be masked to prevent removal of these portions during etching. The remainder of plates 92 to 94 may be etched to form openings in plates 92 to 94. These plates 92 to 94, when assembled, may form lower reservoir 95, which may include flow channels, e.g., recesses 94a, as shown in FIG. 7. In another embodiment of the invention, holes may be formed on the respective plates 92 to 94 using press machining.

Figure 9A:
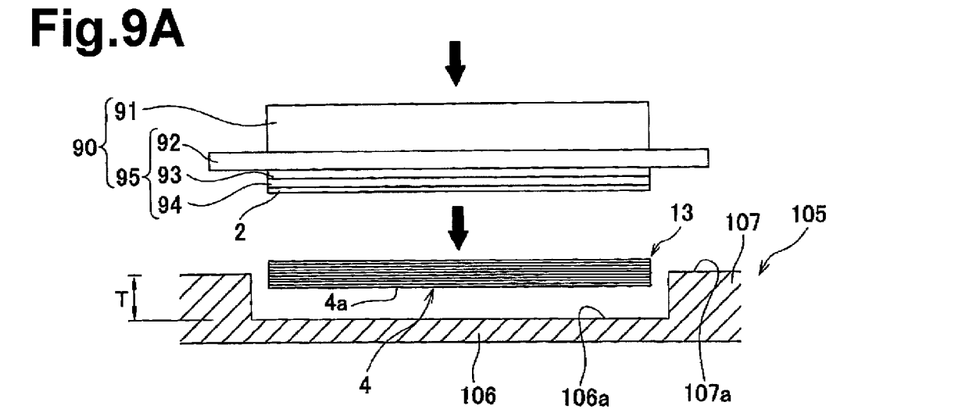
FIGS. 9A to 9C showing an inkjet head at various steps during the process of manufacturing shown in FIG. 8, according to an embodiment of the present invention.
Figure 9B:
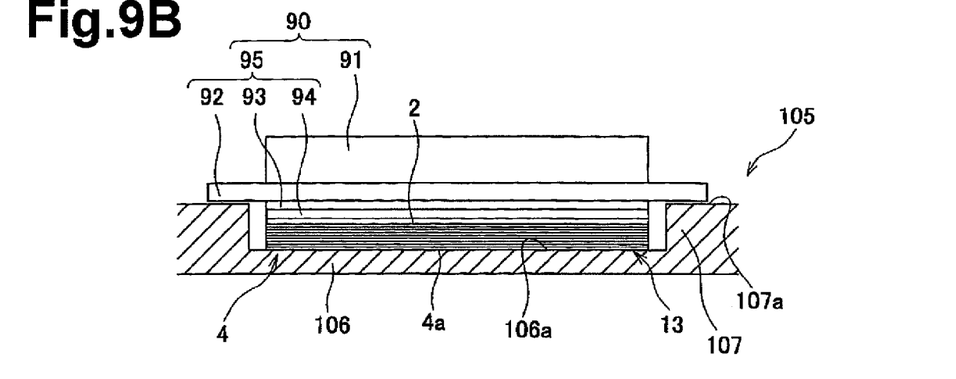
Figure 9C:
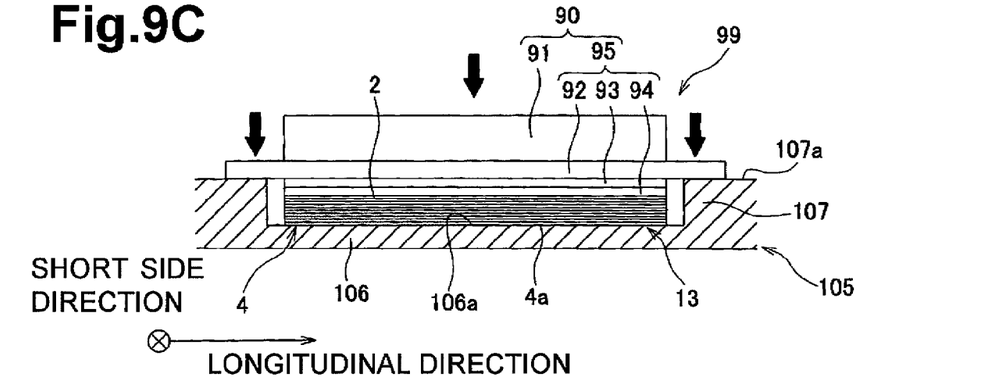

Subsequently, in step S9, an adhesive agent, e.g., an epoxy-based beat cured agent, may be applied to the plates. Specifically, adhesive agent may be applied to lower surfaces, e.g., surfaces closest to under plate 94, of respective plates 92 and 93. Under plate 94 may have no adhesive applied to its lower surface. At this time, the adhesive agent applied to the lower surface of reservoir base plate 92. No adhesive agent may be applied to areas of the both ends of reservoir base plate 92 which do not oppose reservoir plate 93. These areas at the both ends may serve as a mounting surface for mounting the ink-jet head 1 to an apparatus body. These both ends may come into contact with the jig, described further herein with respect to FIG. 9. In step S11, the three plates 92 to 94 may be laminated so that ink reservoir 90a is formed.

Subsequently, in Step S11, the lower reservoir precursor including the three plates 92 to 94 formed in Step S10 may be pressurized while heating to a temperature higher than the curing temperature of the heat-cured adhesive agent. Accordingly, the heat-cured adhesive agent may be cured, and the three plates 92 to 94 may be bonded to each other, so that fabrication of the lower reservoir 95 is completed. At this time, the reservoir base plate 92 may be the thickest and may have the highest rigidity among all the plate members, and hence may be hardly be deformed by external force. Therefore, since the two plates 93 and 94 are bonded along the reservoir base plate 92, the three plates which constitute the lower reservoir 95 can hardly be warped. Then, the upper reservoir 91 may be arranged on the upper surface of the lower reservoir 95, and the upper reservoir 91 and the lower reservoir 95 may be fixed with a screw so that the ink reservoir 90a and the ink flow channel 96 come into communication. In this manner, the reservoir unit 90 is completed.

As a modification, when the heat-resistance temperature of the resin member of the upper reservoir 91 and the film 101 is higher than the curing temperature of the heat-cured adhesive agent, it is also possible to fix the upper reservoir 91 to the lower reservoir precursor with a screw, pressurize the same while heating the lower reservoir precursor, and cure the heat-cured adhesive agent. In this modification as well, the reservoir unit 90 may be manufactured as in Step S11.

Since the flow channel unit fabricating process from Step S1 to Step S4, the actuator unit fabricating process from Step S5 to Step S6, and the reservoir unit fabricating process from Step S7 to Step S11 described above are all performed independently, any one of these may be performed first, and they may be run concurrently.

Subsequently, in Step S12, the epoxy based heat-cured adhesive agent is applied to the upper surface of the flow channel unit 4 obtained in Step S4 and the areas to which the actuator units 21 are bonded. In the first embodiment, the adhesive agent is applied by a bar coater. However, application by a transfer method may also be applicable.

Subsequently, in Step S13, the actuator units 21 may be placed on the heat-cured adhesive agent layer applied on the flow channel unit 4. At this time, the respective actuator units 21 may be positioned with respect to the flow channel unit 4 so that the individual electrodes 35 oppose the pressure chambers 10. This positioning may be achieved on the basis of positioning marks formed on the flow channel unit 4 and the actuator units 21 in the fabricating process in advance.

Subsequently, in Step S14, the laminated member including the flow channel unit 4 and the actuator units 21 laminated in Step S13, that is, the head body precursor may be pressurized while heating to a temperature higher than the curing temperature of the heat-cured adhesive agent. Then, in Step S15, the laminated member may be cooled naturally. Subsequently, in Step S16, the lands 36 of the actuator units 21 and the wiring of the FPC 50 on which the driver IC 52 is mounted may be joined. Accordingly, the head body 13 including the flow channel unit 4 and the actuator units 21 may be completed. In this stage, the head body 13 including the nozzle plate 30 and the reservoir unit 90 including the reservoir base plate 92 may be prepared.

Subsequently, in Step S17, the UV-cured resin may be applied to a predetermined thickness on the lower surface of the reservoir unit 90 (the surface opposing the upper surface of the flow channel unit 4 and the portion having no recess 94a formed thereon). The UV-cured resin may be selected from various types of UV-cured resins, and may be bridge-cured by energy of the LUV light. The UV-cured resin may have a higher viscosity than the heat-cured adhesive agent applied in Step S2, Step S9, and Step S12, and hence may be applied to a predetermined thickness.

Here, a jig 105 used in Step S18 will be described. The jig 105 includes a supporting portion 106 having a plane 106a extending in parallel with the ink discharge surface 4a as shown in FIG. 9A for supporting the ink discharge surface 4a, and a pair of walls 107 formed at positions outside the supporting portion 106 in plan view and opposing the both ends in the longitudinal direction of the reservoir base plate 92. The supporting portion 106 may be interposed between the pair of walls 107 from both sides, and hence may have a recessed shape in cross section. The plane 106a may have a shape slightly larger than the ink discharge surface 4a in plan view. The upper surfaces 107a of the pair of walls 107 may extend in parallel with the plane 106a and may be formed at a position projecting from the plane 106a in the direction vertical to the plane 106a by a predetermined distance T. The predetermined distance T may correspond to the sum of the thickness of the nine plates 22 to 30 which constitute the flow channel unit 4, the thickness of the two plates 93 and 94 which constitute the lower reservoir 95 other than the reservoir base plate 92, and the thickness of the heat-cured adhesive agent among the respective plates.

In Step S18, as shown in FIG. 9A and FIG. 9B, the head body 13 may be placed on the plane 106a of the supporting portion 106 so that the plane 106a of the supporting portion 106 of the jig 105 and the ink discharge surface 4a of the flow channel unit 4 come into abutment to each other. Then, the reservoir unit 90 may be laminated on the upper surface of the flow channel unit 4 while positioning the reservoir unit 90 with respect to the head body 13 and the jig 105 so that the through holes 63 formed on the under plate 94 and the ink supply ports 5b of the flow channel unit 4 are brought into communication and the both ends in the longitudinal direction of the reservoir base plate 92 oppose the upper surfaces 107a of the walls 107. The UV-cured resin interposed between the flow channel unit 4 and the reservoir unit 90 may change in thickness depending on its viscosity even when the reservoir unit 90 is laminated from above and hence it may take time until the reservoir base plate 92 and the jig come into contact. Therefore, as shown in FIG. 9B, a slight gap may be formed between the lower surface of the reservoir base plate 92 and the upper surface 107a of the jig.

Subsequently, in Step S19, as shown in FIG. 9C, a laminated member 99 including the head body 13 and the reservoir unit 90 may be pressed toward the jig 105 so that the lower surface of the both ends in the longitudinal direction of the reservoir base plate 92 comes into abutment with the upper surfaces 107a of the walls 107. At this time, since the laminated member 99 is pressed toward the jig 105, the ink discharge surface 4a which comes into abutment with the plane 106a in Step S18 may be maintained in a state of abutment as is. The pressing action at this time may cause the thickness of the UV-cured resin applied to a predetermined thickness to be reduced, so that the lower surfaces of the both ends in the longitudinal direction of the reservoir base plate 92 come into abutment with the upper surfaces 107a. In this state, the UV-cured resin may be irradiated with the UV light from an UV light irradiator to cure the UV-cured resin. When the UV-cured resin reduced in thickness is cured in this manner, the adhesive layer 2 for joining the reservoir unit 90 and the flow channel unit 4 may be formed, and hence formation of the layered member 99 including the reservoir unit 90 and the head body 13 in which the predetermined distance T from the plane 106a of the jig 105 to the upper surfaces 107a may become substantially the same as the distance from the lower surface of the reservoir base plate 92 to the ink discharge surface 4a is completed.

Then, the FPC 50 and the control board 54 may be electrically connected via the connector 54a, and a process to assemble the side cover 53 and the head cover 55 so as to surround the reservoir unit 90 and the actuator units 21 with the flow channel unit 4 may be performed so that the ink-jet head 1 described above is completed.

According to the method of manufacturing the ink-jet head 1 in the first embodiment as described thus far, the reservoir unit 90 may be layered on the upper surface of the flow channel unit 4 via the UV-cured resin to form the layered member 99 in the layering process in Step 18. Then, since the UV-cured resin is cured in a state in which the both ends of the reservoir base plate 92 are in abutment with the upper surfaces 107a and the ink discharge surface 4a is in abutment with the plane 106a in the curing process in Step S19, the distance from the lower surface of the reservoir base plate 92 to the ink discharge surface 4a may become substantially the same as the predetermined distance T of the jig 105. Therefore, the distances from the reservoir base plate 92 as the fixing plate to the ink discharge surface 4a in the ink-jet heads 1 may be uniformed among the ink-jet heads 1 formed by the same jig 105. Consequently, when the ink-jet head 1 is mounted to the recording apparatus such as a printer via the reservoir base plate 92, the distance from the mounting position thereof to the ink discharge surface 4a may not be varied from ink-jet head to ink-jet head, so that the obtained printing quality is stabilized.

Since the layered member 99 is configured by laminating the reservoir unit 90 and the flow channel unit 4 after forming the reservoir unit 90 and the flow channel unit 4 individually, it can be handled easily in comparison with the case in which the plurality of plates which constitute the reservoir unit 90 and the flow channel unit 4 are laminated at a time to configure the laminated member like the layered member 99.

After having applied the UV-cured resin on the lower surface of the reservoir unit 90, the reservoir unit 90 may be arranged on the upper surface of the flow channel unit 4 via the UV-cured resin. In this manner, even in the case in which the reservoir unit 90 and the flow channel unit 4 are formed individually, and are layered respectively for manufacturing the ink-jet head 1, the distance from the reservoir base plate 92 as the fixing plate for the manufactured ink-jet head 1 to the ink discharge surface 4a cannot be varied from ink-jet head to ink-jet head.

Subsequently, a method of manufacturing an ink-jet head according to a second embodiment of the invention will be described below with reference to FIG. 10. Like parts as in the first embodiment described above are represented by the same reference numerals and description will be omitted.

According to the method of manufacturing the ink-jet head in the second embodiment, heat-cured resin may be employed in bonding the reservoir unit 90 and the head body 13 instead of the UV-cured resin employed in the first embodiment, and when curing the heat-cured adhesive agent among the nine plates which constitute the flow channel unit 4, among the three plates 92 to 94 which constitute the lower reservoir 95, and between the flow channel unit 4 and the actuator units 21, the heat-cured resin may be simultaneously cured.

Figure 10:
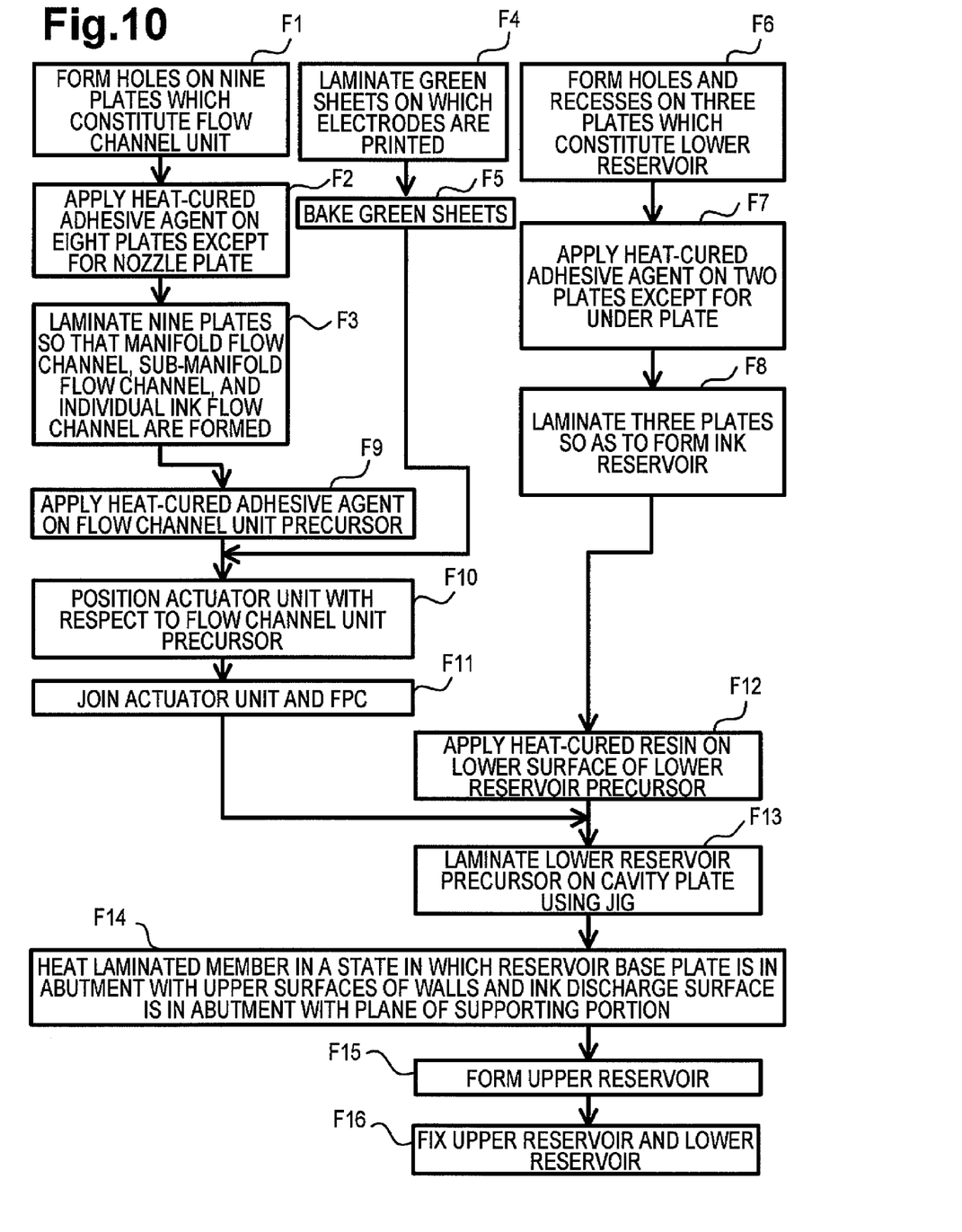
FIG. 10 is a flowchart showing a manufacturing process of manufacturing an ink-jet head according to another embodiment of the present invention.

In order to manufacture the ink-jet head according to the second embodiment, as shown in FIG. 10, Step F1 to Step F3 which are the same as Step S1 to Step S3 in the first embodiment are performed. Accordingly, the flow channel unit precursor including the nine plates 22 to 30 may be formed. Subsequently, Step F4 to Step F5 which are the same as Step S5 to Step S6 in the first embodiment are performed to manufacture the actuator units 21.

Subsequently, Step 6 (F6) to Step 8 (F8) which are the same as Step 8 to Step 10 in the first embodiment are performed. Accordingly, the lower reservoir precursor including the three plates 92 to 94 is formed.

Subsequently, Step F9 to Step F10 which are substantially the similar to Step S12 to Step S13 in the first embodiment are performed. In other words, epoxy-based heat-cured adhesive agent may be applied in the areas for bonding the actuator units 21, which corresponds to the upper surface of the flow channel unit precursor, and then the actuator units 21 may be positioned and placed on the heat-cured adhesive agent layer in the same manner as the first embodiment, so that the head body precursor is formed.

Subsequently Step F11 to Step F12 which are similar to Step S16 to Step S17 in the first embodiment are performed. In other words, after the lands 36 of the actuator units 21 are joined with the wiring of the FPC 50 on which the driver IC 52 is mounted, the heat-cured resin may be applied to the lower surface of the lower reservoir precursor (the surface opposing the upper surface of the cavity plate 22 and the portion where the recesses 94a are not formed) to a predetermined thickness. The heat-cured resin includes a various types of heat-cured resins and is cured by being heated to a temperature higher than its curing temperature. The heat-cured resin may be also high in viscosity in comparison with the heat-cured adhesive agent applied in Step S2, Step S7, and Step S9 like the UV-cured resin in the first embodiment, and may be applied to a predetermined thickness. The heat-cured adhesive agent applied in Step 2, Step 7, and Step 9 may be replaced with the heat-cured resin.

Subsequently, in Step F13, the head body precursor may be placed on the plane 106a of the supporting portion 106 using the jig 105 as in the first embodiment so that the plane 106a of the supporting portion 106 of the jig 105 and the lower surface of the head body precursor abut against each other. Then, the lower reservoir precursor may be laminated on the upper surface of the cavity plate 22 of the head body precursor via the heat-cured resin while positioning the lower reservoir precursor with respect to the head body precursor and the jig 105 so that the through holes 63 formed on the under plate 94 and the ink supply ports 5b of the cavity plate 22 come into communication with each other and the both ends in the longitudinal direction of the reservoir base plate 92 oppose the upper surfaces 107a of the walls 107. At this time as well, there may be a case in which the both ends in the longitudinal direction of the reservoir base plate 92 does not come into contact with the upper surfaces 107a unless otherwise taking some time depending on the viscosity of the used heat-cured resin.

Subsequently, in Step F14, the layered member formed in Step F13 (that is, the member in which the head body precursor and the lower reservoir precursor are laminated) may be pressed toward the jig 105 so that the lower Surface of the both ends in the longitudinal direction of the reservoir base plate 92 abuts against the upper surfaces 107a of the walls 107. At this time, since the laminated member is pressed toward the jig 105, the ink discharge surface 4a which is in abutment with the plane 106a in Step F13 may be maintained in the abutted state. The pressing action at this time may cause the thickness of the heat-cured resin applied to a predetermined thickness to be reduced, so that the lower surface of the both ends in the longitudinal direction of the reservoir base plate 92 comes into abutment with the upper surfaces 107a. In this states the layered member formed in Step F13 is heated to cure the heat-cured resin. When the heat-cured resin reduced in thickness is cured in this manner, an adhesive layer similar to the adhesive layer 2 in the first embodiment may be formed, and hence formation of the layered member including the head body 13 and the lower reservoir 95 in which the predetermined distance T from the plane 106a of the jig 105 to the upper surfaces 107a becomes the substantially same as the distance from the lower surface of the reservoir base plate 92 to the ink discharge surface 4a may be completed. Since the heat-cured adhesive agent among the respective plates is also cured by heating in Step F14, the head body precursor may become the head body 13, and the lower reservoir precursor may become the lower reservoir 95.

Subsequently, Step F15 similar to Step S7 in the first embodiment may be performed to form the upper reservoir 91. In Step F16, the upper reservoir 91 may be arranged on the upper surface of the lower reservoir 95 formed in Step F14 so that the ink reservoir 90a and the ink flow channel 96 come into communication, and the upper reservoir 91 and the lower reservoir 95 may be fixed with a screw. In this manner, formation of the laminated member including the head body 13 and the reservoir unit 90 may be completed.

Then, the FPC 50 and the control board 54 may be electrically connected via the connector 54a, and a process to assemble the side cover 53 and the head cover 55 so as to surround the reservoir unit 90 and the actuator units 21 with the flow channel unit 4 may be performed so that the ink-jet head in the second embodiment is completed.

According to the method of manufacturing the ink-jet head in the second embodiment described thus far, the plurality of plates which constitute the ink-jet head may be cured at a time in the curing process in Step F14, so that the manufacturing process of the ink-jet head may be shortened in comparison with the first embodiment.

Although the preferred embodiments of the invention have been described thus far, the invention is not limited to the above-described embodiments, and various modifications may be made without departing the scope of the claims. For example, although the UV-cured and heat-cured resins may be applied between the flow channel unit 4 and the reservoir unit 90 by a predetermined thickness so that the distance from the reservoir base plate 92 to the ink discharge surface 4a in the height direction becomes the predetermined distance T in the respective embodiments described above, the UV-cured or heat-cured resin forming the adhesive layer may be applied between the plates other than between the cavity plate 22 and the under plate 94. When the UV-cured or heat-cured resin is applied between the reservoir base plate 92 and the reservoir plate 93, and between the reservoir plate 93 and the under plate 94, application work of the UV-cured or heat-cured resin may be easy in comparison with applying the UV-cured or heat-cured resin among nine plates which constitute the flow channel unit 4. This is because the number for holes formed on the three plates 92 to 94 is smaller than the plurality of holes formed respectively on the nine plates 22 to 30, so that the shape of the area to be applied is simpler on the three plates 92 to 94. As regards this point, it may be the same in the above-described respective embodiments. Furthermore, since the through holes which constitute the ink reservoir 90a of the reservoir unit 90 are larger than the plurality of holes which constitute the plurality of individual ink flow channels 32, the event such that the applied UV-cured or heat-cured resin is protruded toward the ink reservoir 90a side to clog a part thereof rarely occurs.

Although the UV-cured resin and the heat-curd resin arranged between the flow channel unit 4 and the reservoir unit 90 may be higher in viscosity than the resin used for other portions, it may be lowered within a range in which it may be applied to the predetermined thickness, and it may be the same as the one used for other portions. In this case, it is not necessary to differentiate the resin material depending on the portions, and hence it may be advantageous in terms of cost. In Step S18 and Step F13, the lower surfaces of the both ends of the reservoir base plate 92 come into abutment with the upper surfaces 107a immediately by the self-weight of the reservoir unit 90, and hence in Step S19 and Step F14, the curing process of the resin material must simply be applied.

What is claimed is:

1. A method of manufacturing an ink jet head, wherein the ink jet head comprises a plurality of plates comprising a nozzle plate having an ink discharge surface, and a fixing plate comprising:
   (a) forming at least one hole through each of the plurality of plates;
   (b) applying an adhesive agent to at least a first one of the plurality of plates;
   (c) contacting the ink discharge surface and a support surface of a jig;
   (d) contacting the first of the plurality of plates and a second of the plurality of plates, wherein the at least one hole through each of the plurality of plates defines a flow channel through the plurality of plates;
   (e) contacting the fixing plate and at least a pair of abutment portions of the jig, wherein the pair of abutment portions of the jig are positioned adjacent to and are raised with respect to the support surface of the jig, wherein a length of the fixing plate is greater than a length of each of the nozzle plate, the first one of the plurality of plates, and the second one of the plurality of plates; and
   (f) curing the adhesive agent,
   wherein step (d) is performed after a performance of step (c),
   wherein step (e) is performed at substantially the same time as a performance of step (d); and
   wherein step (f) is performed after a performance of steps (c), (d), and (e).

2. The method of claim 1, wherein the length of the fixing plate is greater than a length of each of the remaining plurality of plates.

3. The method of claim 1, wherein step (a) is performed before a performance of step (b), and step (b) is performed before a performance of steps (c), (d), (e), and (f).

4. The method of claim 1, wherein the adhesive agent comprises a heat-cured resin.

5. The method of claim 1, wherein the plurality of plates comprise a first plurality of plates corresponding to a flow channel unit and a second plurality of plates corresponding to a reservoir unit, wherein the first plurality of plates comprises the second one of the plurality of plates and the nozzle plate, and the second plurality of plates comprises the first of the plurality of plates and the fixing plate.

6. The method of claim 5, wherein a first portion of the flow channel is formed in the first plurality of plates and a second portion of the flow channel is formed in the second plurality of plates.

* * * * *